United States Patent
Arvidson et al.

(10) Patent No.: US 9,273,418 B2
(45) Date of Patent: Mar. 1, 2016

(54) HYBRID FIBER UNIDIRECTIONAL TAPE AND COMPOSITE LAMINATES

(71) Applicant: Honeywell International Inc., Morristown, NJ (US)

(72) Inventors: Brian D. Arvidson, Chester, VA (US); Ashok Bhatnagar, Richmond, VA (US); David A. Hurst, Richmond, VA (US); Robert C. Ramsdell, Chester, VA (US); Lori L. Wagner, Richmond, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 242 days.

(21) Appl. No.: 13/830,733

(22) Filed: Mar. 14, 2013

(65) Prior Publication Data

US 2014/0072758 A1 Mar. 13, 2014

Related U.S. Application Data

(60) Provisional application No. 61/648,520, filed on May 17, 2012.

(51) Int. Cl.
| | | |
|---|---|---|
| *D04H 3/05* | (2006.01) | |
| *F41H 5/04* | (2006.01) | |
| *D04H 3/009* | (2012.01) | |
| *D04H 3/011* | (2012.01) | |
| *D04H 3/04* | (2012.01) | |
| *D04H 3/12* | (2006.01) | |
| *D04H 3/14* | (2012.01) | |
| *B32B 5/02* | (2006.01) | |
| *B32B 5/12* | (2006.01) | |
| *D03D 15/00* | (2006.01) | |

(52) U.S. Cl.
CPC *D04H 3/05* (2013.01); *B32B 5/022* (2013.01); *B32B 5/024* (2013.01); *B32B 5/12* (2013.01); *D03D 15/0094* (2013.01); *D04H 3/009* (2013.01); *D04H 3/011* (2013.01); *D04H 3/04* (2013.01); *D04H 3/12* (2013.01); *D04H 3/14* (2013.01); *F41H 5/0485* (2013.01); *Y10T 428/24132* (2015.01); *Y10T 428/249921* (2015.04); *Y10T 442/30* (2015.04); *Y10T 442/643* (2015.04); *Y10T 442/659* (2015.04); *Y10T 442/697* (2015.04)

(58) Field of Classification Search
CPC .................. Y10T 428/24; Y10T 428/24132
USPC .................................................. 428/114, 98
See application file for complete search history.

(56) References Cited

U.S. PATENT DOCUMENTS

| | | | |
|---|---|---|---|
| 4,284,679 A | 8/1981 | Blad et al. | |
| 4,929,503 A | 5/1990 | Shirasaki et al. | |
| 5,061,545 A | 10/1991 | Li et al. | |
| 5,179,244 A | 1/1993 | Zufle | |
| 5,180,880 A | 1/1993 | Zufle | |
| 5,198,281 A | 3/1993 | Muzzy et al. | |
| 5,316,820 A * | 5/1994 | Harpell et al. | 428/109 |
| 5,437,905 A | 8/1995 | Park | |
| 5,598,831 A | 2/1997 | Izuta | |
| 5,668,344 A | 9/1997 | Bornstein | |
| 5,677,029 A * | 10/1997 | Prevorsek et al. | 428/113 |
| 6,119,575 A | 9/2000 | Dragone et al. | |
| 6,775,970 B2 | 8/2004 | Fernandez | |
| 6,945,153 B2 | 9/2005 | Knudsen et al. | |
| 2002/0037391 A1* | 3/2002 | Harpell et al. | 428/103 |
| 2004/0092183 A1 | 5/2004 | Geva et al. | |
| 2005/0287891 A1 | 12/2005 | Park | |
| 2008/0085411 A1 | 4/2008 | Prickett | |
| 2008/0085645 A1* | 4/2008 | Prickett | 442/123 |
| 2008/0119099 A1 | 5/2008 | Palley | |
| 2008/0160247 A1 | 7/2008 | Chiou | |
| 2009/0053442 A1 | 2/2009 | Nguyen et al. | |
| 2009/0107609 A1 | 4/2009 | Westgate et al. | |
| 2011/0129657 A1 | 6/2011 | Clough | |

FOREIGN PATENT DOCUMENTS

| | | |
|---|---|---|
| DE | 102010012719 | 9/2011 |
| EP | 1054092 | 11/2000 |
| EP | 2055817 | 6/2009 |
| WO | 9421450 | 9/1994 |
| WO | 2008045441 | 4/2008 |
| WO | 2011070116 | 6/2011 |
| WO | 2012080274 | 6/2012 |

* cited by examiner

*Primary Examiner* — Brent O'Hern

(74) *Attorney, Agent, or Firm* — Roberts & Roberts, LLP; Richard S. Roberts, Jr.

(57) ABSTRACT

Ballistic resistant materials and articles formed from fiber/tape plies that incorporate multiple different fiber or tape types within a single ply. The different fiber or tape types are physically dissimilar but may be chemically different or substantially chemically similar.

11 Claims, No Drawings

HYBRID FIBER UNIDIRECTIONAL TAPE AND COMPOSITE LAMINATES

CROSS-REFERENCE TO RELATED APPLICATION

This application claims the benefit of U.S. Provisional Application Ser. No. 61/648,520, filed on May 17, 2012, the disclosure of which is incorporated by reference herein in its entirety.

BACKGROUND

1. Technical Field

The invention relates to ballistic resistant materials and articles formed from fiber plies that incorporate multiple different fiber types within a single fiber ply.

2. Description of the Related Art

Ballistic resistant articles containing high strength fibers are well known. Articles such as ballistic resistant vests, helmets, vehicle panels and structural members of military equipment are typically made from fabrics comprising high strength fibers. Many types of high strength fibers are known, such as ultra-high molecular weight polyethylene fibers, aramid fibers, polybenzoxazole fibers, liquid crystal copolyester fibers and M5® rigid rod fibers. See, for example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, the disclosures of which are incorporated herein by reference to the extent consistent herein, which describe ballistic resistant composites formed from ultra-high molecular weight polyethylene.

Each fiber type has its own unique characteristics and properties, and as a result, the properties of composites fabricated from high strength fibers may vary depending on fiber type used. For example, aramid fibers have high surface energy because their surfaces contain polar functional groups, and thus resins generally exhibit a strong affinity for aramid fibers. In comparison, ultra-high molecular weight polyethylene fibers are naturally inert and generally exhibit a weaker affinity for resin coatings. This difference can be important depending on the desired end use of the composite.

Another factor affecting ballistic resistance is the type of fabric construction. For example, in applications such as bullet resistant vests, it may be desirable to fabricate woven or knitted fabrics without coating the fibers with a polymeric binder to form flexible fabric composites. In other applications, such as bullet resistant helmets, it may be desirable to encapsulate or embed fibers in a polymeric binder material to form non-woven, rigid fabric composites.

In this regard, non-woven, unidirectional composites are among the highest performing materials in the armor industry. In a typical method for manufacturing non-woven, unidirectional composites, multiple plies of unidirectionally arranged fibers are stacked orientation and pressed together with heat and pressure to produce a composite. To take advantage of the different properties of different fiber types, it has been known to form hybrid, non-woven composites where fiber plies formed from differing fiber types are combined into a single armor structure. See, for example, U.S. Pat. Nos. 5,179,244 and 5,180,880 which teach body armor where aramid and non-aramid fiber plies are joined into a combined structure. See also U.S. Pat. No. 6,119,575 which teaches a hybrid structure comprising at least one ply of aromatic fibers in a first polymeric matrix, at least one ply of a woven plastic, and at least one ply of polyolefin fibers in a second polymeric matrix.

In each of the composites described in U.S. Pat. Nos. 5,179,244; 5,180,880 and 6,119,575, each of the individual component plies consists of only one fiber type, where one unidirectional fiber ply is composed of all one fiber type and other fiber plies are composed of another fiber type. Such a construction fails to take full advantage of the differing properties of the different fibers, such as resin adhesion, consolidation temperature, frictional characteristics, cut resistance, etc. Additionally, due to the nature of their physical construction, such hybrid structures are unduly limited in composite homogeneity and in the percentage of each fiber type within a composite. There is a need in the art for a solution to these drawbacks, and this invention provides a solution to this need. Particularly, it has been found that by combining different types of fibers within a single fiber ply, a synergistic effect is achieved wherein the varied properties of each fiber type better complement each other to thereby form an improved ballistic resistant composite.

The ballistic penetration resistance of a composite is directly related to the strength of the constituent fibers of the composite, where increases in fiber strength properties such as tenacity and/or tensile modulus correlate with an increase in $V_{50}$ velocity. Accordingly, fibers having high tensile properties, such as ultra-high molecular weight polyethylene fibers, are desirable herein. There is also a direct correlation between backface signature (also known in the art as "backface deformation", "trauma signature" or "blunt force trauma") and the bond strength of a resin coating on a fiber at the resin/fiber interface, where stronger bond strength correlates with lower backface signature. Accordingly, fibers having a strong affinity for resin/polymer coatings, such as aramid fibers, are desirable herein.

Other high performance structural fibers, such as carbon fibers, glass fibers, and polyester fibers, such as polyethylene terephthalate and polyethylene naphthalate fibers, are known to provide other desirable properties such as thermal stability, abrasion resistance, cut resistance and impact energy absorption. The fibrous materials of the invention are formed from one or more hybrid fiber plies that are formed by combining at least two different fiber types to take advantage of the different advantageous properties provided by each fiber type without trading off or sacrificing other desired properties.

SUMMARY

The invention provides a material comprising at least one hybrid ply, which hybrid ply comprises a plurality of fibers or a plurality of tapes, which plurality of fibers comprises at least two physically different fiber types and which plurality of tapes comprises at least two physically different tape types, which physically different fiber or tape types have at least one dissimilar physical property.

The invention also provides a non-woven material comprising at least one hybrid ply, each hybrid ply comprising a plurality of unidirectionally oriented, substantially parallel fibers or a plurality of unidirectionally oriented, substantially parallel tapes, which plurality of fibers comprises at least two physically different fiber types and which plurality of tapes comprises at least two physically different tape types, which physically different fiber or tape types have at least one dissimilar physical property, and wherein adjacent parallel fibers or adjacent parallel tapes in each hybrid ply are different fiber types or different tape types.

DETAILED DESCRIPTION

Composites and other fibrous materials are provided that achieve a balance of excellent structural properties, superior ballistic penetration resistance and low backface signature performance.

As used herein, a "hybrid" has the ordinary and customary meaning of a thing made by combining two or more different elements, which in the context of the present invention is two or more different fiber types, two or more different tape types, or combinations thereof. A "hybrid ply" may comprise a plurality of fibers, which plurality of fibers comprises at least two physically different fiber types, which physically different fiber types have at least one dissimilar physical property. A "hybrid ply" may alternatively comprise a plurality of tapes, which plurality of tapes comprises at least two physically different tape types, which physically different tape types have at least one dissimilar physical property.

As used herein, different fiber/tape types refers to fibers/tapes that are at minimum physically different fiber/tape types, i.e. fibers/tapes that have at least one dissimilar physical property. Examples of physical properties of fibers/tapes include fiber/tape tensile properties, such as tenacity, initial tensile modulus, ultimate tensile strength and ultimate elongation/elongation-at-break. Other physical properties include fiber/tape density, fiber/tape denier, denier per filament, creep tendency (as determined by ASTM D6992), fiber/tape diameter, electric properties (including dielectric properties, such as dielectric constant, and loss tangent properties), and thermal properties, including the coefficient of thermal expansion in fiber/tape axial and transverse directions.

As used herein, physical properties also include the physical characteristics of a fiber/tape surface, such as the presence or absence of a fiber/tape surface finish, or whether or not the fiber/tape surfaces have been treated, such as by plasma treating or corona treating. Various surface treatments are described in application Ser. Nos. 61/531,233; 61/531,255; 61/531,268; 61/531,302; and 61/531,323, the entire disclosures of which are incorporated by reference herein.

For the purposes of the present invention, a "fiber" is an elongate body the length dimension of which is much greater than the transverse dimensions of width and thickness. The cross-sections of fibers for use in this invention may vary widely, and they may be circular, flat or oblong in cross-section. Thus the term "fiber" includes filaments, ribbons, strips and the like having regular or irregular cross-section, but it is preferred that the fibers have a substantially circular cross-section. As used herein, the term "yarn" is defined as a single continuous strand consisting of multiple fibers or filaments. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. The definition of multifilament fibers herein also encompasses pseudo-monofilament fibers, which is a term of art describing multifilament fibers that are at least partially fused together and look like monofilament fibers. Multifilament fibers of the invention preferably include from 2 to about 1000 filaments, more preferably from 30 to 500 filaments, still more preferably from 100 to 500 filaments, still more preferably from about 100 filaments to about 250 filaments and most preferably from about 120 to about 240 filaments. Multifilament fibers are also often referred to in the art as bundles of fibers.

A "fiber ply" or "tape ply" as used herein may comprise a single sheet or generally planar stratum of substantially non-overlapping unidirectionally oriented fibers, fibrous tapes, non-fibrous tapes, or a combination thereof. This may alternately be described as an array of substantially parallel fibers/tapes. This type of fiber/tape arrangement is also known in the art as a "unitape", "unidirectional tape", "UD" or "UDT." As used herein, an "array" describes an orderly arrangement of fibers, yarns or tapes, which is exclusive of woven fabrics, and a "parallel array" describes an orderly parallel arrangement of fibers, yarns or tapes. The term "oriented" as used in the context of "oriented fibers" refers to the alignment of the fibers. A "fiber ply" may also refer to a woven fabric. A single "ply" is exclusive of a consolidated structure that incorporates multiple woven fabrics or multiple arrays of substantially parallel fibers/tapes that are stacked and merged.

On the other hand, a "fiber layer" or "tape layer" as used herein may comprise a single-ply of unidirectionally oriented fibers/tapes, a plurality of consolidated plies of unidirectionally oriented fibers/tapes, a woven fabric, a plurality of consolidated woven fabrics, or any other fabric structure that has been formed from a plurality of fibers/tapes, including felts, mats and other structures, such as those comprising randomly oriented fibers/tapes. A "layer" describes a generally planar arrangement. A fiber layer will have both an outer top surface and an outer bottom surface.

The term "fabric" describes structures that may include one or more fiber plies, with or without molding or consolidation of the plies. For example, a woven fabric or felt may comprise a single fiber ply. A non-woven fabric formed from unidirectional fibers/tapes typically comprises a plurality of fiber plies stacked on each other and consolidated. When used herein, a "single-layer" structure refers to any monolithic fibrous structure composed of one or more individual plies or individual layers that have been merged, i.e. consolidated by low pressure lamination or by high pressure molding, into a single unitary structure, optionally together with a polymeric binder material. By "consolidating" it is meant that a polymeric binder material together with each fiber ply is combined into a single unitary layer. Consolidation can occur via drying, cooling, heating, pressure or a combination thereof. Heat and/or pressure may not be necessary, as the fibers/tapes or fabric layers may just be glued together, as is the case in a wet lamination process. The term "composite" refers to combinations of fibers/tapes, typically with at least one polymeric binder material. A "complex composite" refers to a consolidated combination of a plurality of fiber/tape layers. As described herein, "non-woven" fabrics include all fabric structures that are not formed by weaving. For example, non-woven fabrics may comprise a plurality of unitapes that are at least partially coated with a polymeric binder material, stacked/overlapped and consolidated into a single-layer, monolithic element, as well as a felt or mat comprising non-parallel, randomly oriented fibers that are preferably coated with a polymeric binder composition.

As used herein, the term "tape" refers to a narrow strip of fibrous or non-fibrous material. Tapes are generally flat structures having a substantially rectangular cross-section and having a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 µm), more preferably from about 0.35 mil (8.89 µm) to about 3 mils (76.2 µm), and most preferably from about 0.35 mil to about 1.5 mils (38.1 µm). Thickness is measured at the thickest region of the cross-section. A tape generally has a width less than or equal to about 6 inches (15.24 cm), with a preferred width of from about 2.5 mm to about 50 mm, more preferably from about 5 mm to about 50 mm, still more preferably from about 5 mm to about 25.4 mm (1 inch), even more preferably from about 5 mm to about 20 mm, and most preferably from about 5 mm to about 10 mm. These dimensions may vary but the polymeric tapes formed herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred polymeric tapes have an average cross-sectional aspect ratio of at least about 400:1.

A tape may be a fibrous material or a non-fibrous material. A "fibrous" tape material is a tape that comprises one or more filaments. The cross-section of a polymeric tape of the invention may be rectangular, oval, polygonal, irregular, or of any shape satisfying the width, thickness and aspect ratio requirements outlined herein.

Methods for fabricating fibrous tapes are described, for example, in U.S. Pat. No. 8,236,119 and U.S. patent application Ser. Nos. 13/021,262; 13/494,641; 13/568,097; 13/647,926 and 13/708,360, the disclosures of which are incorporated herein by reference. Other methods for fabricating fibrous tapes are described, for example, in U.S. Pat. Nos. 2,035,138; 4,124,420; 5,115,839, or by use of a ribbon loom specialized for weaving narrow woven fabrics or ribbons. Useful ribbon looms are disclosed, for example, in U.S. Pat. Nos. 4,541,461; 5,564,477; 7,451,787 and 7,857,012, each of which is assigned to Textilma AG of Stansstad, Switzerland, and each of which is incorporated herein by reference to the extent consistent herewith, although any alternative ribbon loom is equally useful. Polymeric tapes may also be formed by other conventionally known methods, such as extrusion, pultrusion, slit film techniques, etc. For example, a unitape of standard thickness may be cut or slit into tapes having the desired lengths. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. No. 6,098,510 and U.S. Pat. No. 6,148,871 mare incorporated herein by reference to the extent consistent herewith. Methods for fabricating non-woven, non-fibrous polymeric tapes are described, for example, in U.S. Pat. Nos. 7,300,691; 7,964,266 and 7,964,267, which are incorporated herein by reference. For each of these tape embodiments, multiple layers of tape-based materials may be stacked and consolidated/molded in a similar fashion as the fibrous materials, with or without a polymeric binder material.

Non-fibrous polymeric tapes are formed by conventionally known methods, such as extrusion, pultrusion, slit film techniques, fiber compressing/flattening techniques, etc. For example, a unitape of standard thickness may be cut or slit into tapes having the desired lengths, which is a desired method for producing tapes from multi-ply non-woven fiber layers. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. No. 6,098,510 and U.S. Pat. No. 6,148,871 are incorporated herein by reference to the extent consistent herewith. Other exemplary methods are described in U.S. Pat. Nos. 7,300,691; 7,964,266 and 7,964,267, which are incorporated herein by reference to the extent consistent herewith. It is also known to form narrow tape structures by weaving thin strips of fabric, which generally may be accomplished by adjusting the settings on any conventional weaving machine, such as those disclosed in U.S. Pat. Nos. 2,035,138; 4,124,420; 5,115,839, which are incorporated by reference herein to the extent consistent herewith, or by use of a ribbon loom specialized for weaving narrow woven fabrics or ribbons. Useful ribbon looms are disclosed, for example, in U.S. Pat. Nos. 4,541,461; 5,564,477; 7,451,787 and 7,857,012, each of which is assigned to Textilma AG of Stansstad, Switzerland, and each of which is incorporated herein by reference to the extent consistent herewith, although any alternative ribbon loom is equally useful.

At least a portion of the fibers in a hybrid fiber ply are high-strength, high tensile modulus polymeric fibers. As used herein, a "high-strength, high tensile modulus" fiber is one which has a preferred tenacity of at least about 7 g/denier or more, a preferred tensile modulus of at least about 150 g/denier or more, and preferably an energy-to-break of at least about 8 J/g or more, each as measured by ASTM D2256 fibers. As used herein, the term "denier" refers to the unit of linear density, equal to the mass in grams per 9000 meters of fiber. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fibers include polyolefin fibers, including high density and low density polyethylene. Particularly preferred are extended chain polyolefin fibers, such as highly oriented, high molecular weight polyethylene fibers, particularly ultra-high molecular weight polyethylene fibers, and polypropylene fibers, particularly ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred fiber types include polyethylene, particularly extended chain polyethylene fibers, aramid fibers, PBO fibers, liquid crystal copolyester fibers, polypropylene fibers, particularly highly oriented extended chain polypropylene fibers, polyvinyl alcohol fibers, polyacrylonitrile fibers and rigid rod fibers, particularly M5® fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the polyethylene fibers sold under the trademark SPECTRA® from Honeywell International Inc. SPECTRA® fibers are well known in the art. Other useful polyethylene fiber types also include and DYNEEMA® UHMWPE yarns commercially available from Royal DSM N.V. Corporation of Heerlen, The Netherlands.

Preferred aramid (aromatic polyamide) or para-aramid fibers are commercially available and are described, for example, in U.S. Pat. No. 3,671,542. For example, useful poly(p-phenylene terephthalamide) filaments are produced commercially by DuPont under the trademark of KEVLAR®. Also useful in the practice of this invention are poly (m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers for the practice of this invention are commercially available and are disclosed for example in U.S. Pat. Nos. 5,286,833, 5,296,185, 5,356,584, 5,534,205 and 6,040,050, each of which is incorporated herein by reference.

Suitable liquid crystal copolyester fibers for the practice of this invention are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available.

M5® fibers are formed from pyridobisimidazole-2,6-diyl (2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference.

Useful glass fibers include S-glass fibers, S2-Glass® fibers commercially available from AGY of Aiken, S.C. and HiPer-Tex™ E-Glass fibers, commercially available from 3B Fibreglass of Battice, Belgium. Also suitable are R-glass fibers, such as those commercially available under the trademark VETROTEX® from Saint-Gobain of Courbevoie, France. Also suitable are combinations of all the above materials.

Fibrous tape materials may be fabricated according to the methods described above using any of the aforementioned fiber/filament types. Particularly suitable high-strength, high tensile modulus non-fibrous polymeric tape materials are polyolefin tapes. Preferred polyolefin tapes include polyethylene tapes, such as those commercially available under the trademark TENSYLON®, which is commercially available from E. I. du Pont de Nemours and Company of Wilmington, Del. See, for example, U.S. Pat. Nos. 5,091,133; 7,964,266 and 7,964,267 which are incorporated herein by reference. Also suitable are polypropylene tapes, such as those commercially available under the trademark TEGRIS® from Milliken & Company of Spartanburg, S.C. See, for example, U.S. Pat. No. 7,300,691 which is incorporated herein by reference. Polyolefin tape-based composites that are useful as spall resistant substrates herein are also commercially available, for example under the trademark DYNEEMA® BT10 from Royal DSM N.V. Corporation of Heerlen, The Netherlands and under the trademark ENDUMAX® from Teijin Aramid Gmbh of Germany.

The fibers/tapes may be of any suitable denier. For example, fibers may have a denier of from about 50 to about 3000 denier, more preferably from about 200 to 3000 denier, still more preferably from about 650 to about 2000 denier, and most preferably from about 800 to about 1500 denier. Tapes may have deniers from about 50 to about 30,000, more preferably from about 200 to 10,000 denier, still more preferably from about 650 to about 2000 denier, and most preferably from about 800 to about 1500 denier. The selection is governed by considerations of ballistic effectiveness and cost. Finer fibers/tapes are more costly to manufacture and to weave, but can produce greater ballistic effectiveness per unit weight.

As stated above, a high-strength, high tensile modulus fiber/tape is one which has a preferred tenacity of about 7 g/denier or more, a preferred tensile modulus of about 150 g/denier or more and a preferred energy-to-break of about 8 J/g or more, each as measured by ASTM D2256. Preferred fibers have a preferred tenacity of about 10 g/denier or more, more preferably about 15 g/denier or more, more preferably about 20 g/denier or more, still more preferably about 25 g/denier or more, still more preferably about 30 g/denier or more, still more preferably about 40 g/denier or more, still more preferably about 45 g/denier or more, and most preferably about 50 g/denier or more. Preferred tapes have a preferred tenacity of about 10 g/denier or more, more preferably about 15 g/denier or more, still more preferably about 17.5 g/denier or more, and most preferably about 20 g/denier or more. Wider tapes will have lower tenacities. Preferred fibers/tapes also have a preferred tensile modulus of about 300 g/denier or more, more preferably about 400 g/denier or more, more preferably about 500 g/denier or more, more preferably about 1,000 g/denier or more and most preferably about 1,500 g/denier or more. Preferred fibers/tapes also have a preferred energy-to-break of about 15 J/g or more, more preferably about 25 J/g or more, more preferably about 30 J/g or more and most preferably have an energy-to-break of about 40 J/g or more. Methods of forming each of the preferred fiber and tape types having these combined high strength properties are conventionally known in the art.

In one embodiment of the invention, the physically different fiber/tape types of a hybrid fiber or hybrid tape ply comprise physically dissimilar fibers or tapes that are substantially chemically similar, i.e. chemically the same, where chemically the same means that they are formed from the same polymer. For example, in a preferred material a hybrid fiber ply or hybrid tape ply comprises a plurality of physically dissimilar polyethylene fibers or tapes. In another preferred fibrous material, a hybrid fiber ply or hybrid tape ply comprises a plurality of physically dissimilar aramid fibers or tapes. In another preferred fibrous material, a hybrid fiber ply or hybrid tape ply comprises a plurality of physically dissimilar polybenzoxazole (PBO) fibers or tapes. While chemically the same, the fiber/tape types within a single hybrid fiber ply or hybrid tape ply will have at least one dissimilar physical property, such as different tenacities, different tensile moduli, different elongations-at-break, different ultimate tensile strengths, different fiber/tape deniers, etc. One or each hybrid fiber or tape layer may also have more than two different fiber/tape types of similar fiber chemistry in a single hybrid fiber/tape ply.

In one preferred embodiment, a single hybrid fiber ply may comprise two or more of SPECTRA® 900 fibers, SPECTRA® 1000 fibers and SPECTRA® 3000 fibers, all of which are commercially available from Honeywell International Inc. of Morristown, N.J. A single hybrid fiber ply may comprise a combination of a plurality of high denier fibers and a plurality of low denier fibers, wherein said high denier fibers have a greater fiber denier than the low denier fibers. For example, a hybrid fiber ply may comprise a combination of 650 denier SPECTRA® 900 fibers, 1200 denier SPECTRA® 900 fibers, 2400 denier SPECTRA® 900 fibers and 4800 denier SPECTRA® 900 fibers. Alternatively, a single hybrid fiber ply may comprise a combination of two or more of 650 denier SPECTRA® 900 fibers, 1200 denier SPECTRA® 900 fibers, 2400 denier SPECTRA® 900 fibers and 4800 denier SPECTRA® 900 fibers. As another example, a single hybrid fiber ply may comprise a combination of two or more of 75 denier SPECTRA® 1000 fibers, 100 denier SPECTRA® 1000 fibers, 130 denier SPECTRA® 1000 fibers, 180 denier SPECTRA® 1000 fibers, 215 denier SPECTRA® 1000 fibers, 275 denier SPECTRA® 1000 fibers, 375 denier SPECTRA® 1000 fibers, 435 denier SPECTRA® 1000 fibers, 650 denier SPECTRA® 1000 fibers, 1300 denier SPECTRA® 1000 fibers, 1600 denier SPECTRA® 1000 fibers and 2600 denier SPECTRA® 1000 fibers. Alternatively, a single hybrid fiber ply may comprise a combination of two or more of 1100 denier SPECTRA® 3000 fibers, 1300 denier SPECTRA® 3000 fibers and 1600 denier SPECTRA® 3000 fibers. Also useful are combinations of any of the above SPECTRA® fiber types with any variety of aramid fibers, polybenzoxazole fibers, liquid crystal copolyester fibers, M5® rigid rod fibers, carbon fibers, glass fibers, polyester fibers, etc, such as a plurality of physically dissimilar polyethylene fibers and a plurality of physically dissimilar aramid fibers. Also useful are analogous combinations of fibrous tapes formed from the above fiber/filament types.

In another embodiment, a single hybrid fiber ply may comprise a plurality of multi-filament fibers having the same fiber denier but where the component filaments of the fiber have different deniers per filament (dpf). In this embodiment, all fibers in the ply could be substantially chemically similar, or the ply may comprise two or more chemically different fiber types, the fiber deniers may be the same, and they may have the same tenacity, tensile modulus, etc., but with different deniers per filament. Accordingly, the fibrous material comprises one or more hybrid fiber plies that comprise a plurality of high denier per filament fibers and a plurality of low denier per filament fibers, said high denier per filament fibers having a greater denier per filament than the low denier per filament fibers. As an example, 650 denier SPECTRA® 900 fibers have a published dpf of 10.8, while 1200 denier SPECTRA® 900 fibers have a published dpf of 10.0. Also useful are analogous combinations of fibrous tapes formed from the above fiber/filament types.

In yet another alternative embodiment, hybrid fiber plies may be fabricated from bundles of hybrid, multifilament fibers wherein a plurality of different filament types are mixed together to form a single hybrid multifilament fiber. Such hybrid fiber bundles may be fabricated, for example, by blending different filaments together with an air jet. A plurality of such hybrid multifilament fibers may then be arranged into fiber plies and subsequently fabricated into fibrous materials, such as woven or non-woven fabrics and composites. However, each fiber preferably comprises a plurality of filaments that are substantially physically similar and substantially chemically similar. To facilitate good fiber spreading, it is also preferred that the physically different fiber types within a hybrid fiber ply are neither twisted nor entangled with each other.

In still yet another useful embodiment, a hybrid fiber ply may comprise some fibers that have been plasma treated or corona treated as described in application Ser. Nos. 61/531,233; 61/531,255; 61/531,268; 61/531,302; and 61/531,323, with other fibers being untreated. In another variation, a hybrid fiber ply may comprise some fibers that have been plasma treated and other fibers that have been corona treated. In another variation, a hybrid fiber ply may comprise some fibers that have had their fiber surface finish substantially removed (which fibers may also optionally be plasma or corona treated) and other fibers which have had none of their fiber surface finish removed (which fibers may also optionally be plasma or corona treated). Also useful are analogous combinations of fibrous tapes formed from the above fiber/filament types.

In a particularly preferred hybrid fiber ply or hybrid tape ply construction, a hybrid fiber/tape ply comprises a plurality of polyethylene fibers and a plurality of aramid fibers. In another particularly preferred hybrid fiber ply construction, said hybrid fiber ply comprises a plurality of high tenacity ballistic-grade fibers having a tenacity of at least about 20 g/denier, such as ultra-high molecular weight polyethylene fibers or aramid fibers or PBO fibers, which layer also comprises a plurality of high performance structural-grade fibers having a tenacity of less than about 10 g/denier, which includes certain carbon fibers, certain glass fibers and certain polyester fibers. In this embodiment comprising both ballistic-grade and structural-grade fibers, it is preferred that the hybrid fiber ply has a high tenacity fiber content of greater than 50% by weight, more preferably at least about 60% by weight and most preferably at least about 70% by weight. Such structural-grade fibers may exhibit a greater affinity to bond with resin/polymer coatings than ballistic-grade fibers. Preferably, in a ply combining both structural-grade fibers and ballistic-grade fibers, the bond strength of a resin to the structural-grade fibers is preferably at least double the bond strength of a resin to the ballistic-grade fibers.

Where a hybrid fiber/tape ply comprises a woven fabric, the woven fabric may be woven using any technique that is well known in the art using any fabric weave, such as plain weave, crowfoot weave, basket weave, satin weave, twill weave and the like. Plain weave is most common, where fibers are woven together in an orthogonal 0°/90° orientation. Also useful are 3D weaving methods wherein multi-ply woven structures are fabricated by weaving warp and weft threads both horizontally and vertically.

A plurality of hybrid fiber plies and/or hybrid tape plies may be merged, i.e. consolidated, according to well known techniques to form multi-ply fiber layers and/or multi-ply tape layers (i.e. complex composites), where the fibers/tapes may optionally be coated with a polymeric binder material to facilitate consolidation. One or more hybrid fiber/tape plies may also be merged with other fiber plies that are not hybrids, i.e. plies composed of a plurality of fibers/tapes that are both physically and chemically the same as each other. However, it is preferred that each ply in a multi-ply composite is a hybrid fiber/tape ply of the invention. This includes merging together a plurality of woven fiber plies into a complex composite, with or without coating/impregnating the fibers with a polymeric binder, as well as merging together a plurality of non-woven fiber plies with or without coating/impregnating the fibers with a polymeric binder.

Methods for the production of non-woven fibrous materials are well known in the art. For example, in a preferred method for forming non-woven fabrics, a plurality of fibers are arranged into at least one array, typically being arranged as a fiber web comprising a plurality of fibers aligned in a substantially parallel, unidirectional array. In a typical process, fiber bundles are supplied from a creel and led through guides and one or more spreader bars into a collimating comb, followed by coating the fibers with a polymeric binder material. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other.

This process of forming non-woven fiber plies allows for great control over the composition of the hybrid fiber ply. For example, the fiber bundles supplied from the creels may be arranged to alternate different types of fiber ends such that adjacent fibers are different across the entire width of the hybrid fiber ply, or another pattern may be specified as desired, such as every fourth or every fifth fiber being a structural-grade fiber with the rest being ballistic-grade fibers. In another method, multiple fiber types may be combined on a single spool of fiber. The percentage of each fiber type within each hybrid fiber ply is also easily controllable, such as a 1/99 to 10/90, or 1/99 to 1/95 percentage ratio of structural-grade fiber to ballistic-grade fiber. This allows for even/homogenous distribution or near homogenous distribution of fiber types within a hybrid fiber ply if desired.

As stated previously, in certain embodiments it is desired to coat the fibers/tapes with a resin or a polymeric binder material. As used herein, a "polymeric" binder includes resins and rubber and it is also commonly known in the art as a "polymeric matrix" material. Such materials bind fibers/tapes together either by way of its inherent adhesive characteristics or after being subjected to well known heat and/or pressure conditions. When present, the polymeric binder material either partially or substantially coats the individual fibers/tapes, preferably substantially coating each of the individual fibers/tapes.

Suitable polymeric binder materials include both low modulus, elastomeric materials and high modulus, rigid materials. As used herein throughout, the term tensile modulus means the modulus of elasticity, which for fibers is measured by ASTM D2256 and by ASTM D638 for a polymeric binder material. The rigidity, impact and ballistic properties of the articles formed from the composites of the invention are affected by the tensile modulus of the polymeric binder polymer coating the fibers. A preferred polymeric binder comprises a low modulus elastomeric material. For the purposes of this invention, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has a preferred elongation to break of at least about 50%, more preferably at least about 100% and most preferably has an elongation to break of at least about 300%. A wide variety of materials and formulations having a low modulus may be utilized as the polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R\text{-}(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Düsseldorf, Germany. Particularly preferred low modulus polymeric binder polymers comprise styrenic block copolymers sold under the trademark KRATON® commercially produced by Kraton Polymers. A particularly preferred polymeric binder material comprises a polystyrene-polyisoprene-polystyrene-block copolymer sold under the trademark KRATON®.

While low modulus polymeric binder materials are preferred for the formation of flexible armor materials, high modulus polymeric binder materials are preferred for the formation of rigid armor articles. Preferred high modulus, rigid materials generally have a higher initial tensile modulus than 6,000 psi. Preferred high modulus, rigid polymeric binder materials useful herein include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. A particularly preferred rigid polymeric binder material is a thermosetting polymer, preferably soluble in carbon-carbon saturated solvents such as methyl ethyl ketone, and possessing a high tensile modulus when cured of at least about $1 \times 10^6$ psi (6895 MPa) as measured by ASTM D638. Particularly preferred rigid polymeric binder materials are those described in U.S. Pat. No. 6,642,159, the disclosure of which is incorporated herein by reference. The polymeric binder, whether a low modulus material or a high modulus material, may also include fillers such as carbon black or silica, may be extended with oils, or may be vulcanized by sulfur, peroxide, metal oxide or radiation cure systems as is well known in the art.

Most specifically preferred are polar resins or polar polymer, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably co-solvent free. Such includes aqueous anionic polyurethane dispersions, aqueous cationic polyurethane dispersions and aqueous nonionic polyurethane dispersions. Particularly preferred are aqueous anionic polyurethane dispersions, and most preferred are aqueous anionic, aliphatic polyurethane dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

Methods for applying a polymeric binder material to fibers/tapes to thereby impregnate fiber plies with the binder are well known and readily determined by one skilled in the art. The term "impregnated" is considered herein as being synonymous with "embedded," "coated," or otherwise applied with a polymeric coating where the binder material diffuses into the layer and is not simply on a surface of the layer. Any appropriate application method may be utilized to apply the polymeric binder material and particular use of a term such as "coated" is not intended to limit the method by which it is applied onto the filaments/fibers/tapes. Useful methods include, for example, spraying, extruding or roll coating polymers or polymer solutions onto the fibers/tapes, as well as transporting the fibers/tapes through a molten polymer or polymer solution. Most preferred are methods that substantially coat or encapsulate each of the individual fibers/tapes and cover all or substantially all of the fiber/tape surface area with the polymeric binder material.

After the fibers/tapes are coated with an optional binder material, the coated fibers/tapes are formed into non-woven fiber layers or non-woven tape layers that comprise a plurality of overlapping, non-woven fiber or tape plies that are consolidated into a single-layer, monolithic element. In a preferred non-woven fabric structure, a plurality of stacked, overlapping unitapes are formed wherein the parallel fibers/tapes of each single ply (unitape) are positioned orthogonally to the parallel fibers/tapes of each adjacent single ply relative to the longitudinal fiber/tape direction of each single ply. The stack of overlapping non-woven fiber/tape plies is consolidated under heat and pressure, or by adhering the coatings of individual fiber/tape plies, to form a single-layer, monolithic element which has also been referred to in the art as a single-layer, consolidated network where a "consolidated network" describes a consolidated (merged) combination of fiber/tape plies with the polymeric matrix/binder. Fibrous materials herein may also comprise a consolidated hybrid combination of woven fabrics and non-woven fabrics, as well as combinations of non-woven fabrics formed from unidirectional fiber/tape plies and non-woven felt fabrics.

Most typically, non-woven fiber/tape layers or fabrics include from 1 to about 6 plies, but may include as many as about 10 to about 20 plies as may be desired for various applications. The greater the number of plies translates into greater ballistic resistance, but also greater weight. As is conventionally known in the art, excellent ballistic resistance is achieved when individual fiber/tape plies are cross-plied such that the fiber/tape alignment direction of one ply is rotated at an angle with respect to the fiber/tape alignment direction of another ply. Most preferably, the fiber/tape plies are cross-plied orthogonally at 0° and 90° angles, but adjacent plies can be aligned at virtually any angle between about 0° and about 90° with respect to the longitudinal fiber/tape direction of another ply. For example, a three ply non-woven structure may have plies oriented at ±45° to form a +45°/0°/−45° structure, or a five ply non-woven structure may have plies oriented at a 0°/45°/90°/45°/0° relative to the respective longitudinal fiber/tape axes of each ply. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith. Other angles are also suitable, such as rotating adjacent plies in 15° increments or 30° increments relative to adjacent plies.

Methods of consolidating fiber/tape plies/layers to form complex composites are well known, such as by the methods described in U.S. Pat. No. 6,642,159. Consolidation can occur via drying, cooling, heating, pressure or a combination thereof. Heat and/or pressure may not be necessary, as the plies/layers may just be glued together, as is the case in a wet lamination process. Typically, consolidation is done by positioning the individual plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material is caused to melt, relatively little pressure is required to form the composite, while if the binder material is only heated to a sticking point, more pressure is typically required. As is conventionally known in the art, consolidation may be conducted in a calendar set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat bed laminator to improve the uniformity and strength of the bond. Further, the consolidation and polymer application/bonding steps may comprise two separate steps or a single consolidation/lamination step.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes.

Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fiber layers are molded has a direct effect on the stiffness or flexibility of the resulting molded product. Particularly, the higher the pressure at which they are molded, the higher the stiffness, and vice-versa. In addition to the molding pressure, the quantity, thickness and composition of the fiber plies and polymeric binder coating type also directly affects the stiffness of the composite material.

While each of the molding and consolidation techniques described herein are similar, each process is different. Particularly, molding is a batch process and consolidation is a generally continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber/tape type.

In the preferred embodiments, the total weight of the binder/matrix comprising a fibrous composite of the invention preferably comprises from about 2% to about 50% by weight, more preferably from about 5% to about 30%, more preferably from about 7% to about 20%, and most preferably from about 11% to about 16% by weight of the fibers/tapes plus the weight of the coating. A lower binder/matrix content is appropriate for woven fabrics, wherein a polymeric binder content of greater than zero but less than 10% by weight of the fibers/tapes plus the weight of the coating is typically most preferred, but this is not intended as limiting. For example, phenolic/PVB impregnated woven fabrics are sometimes fabricated with a higher resin content of from about 20% to about 30%, although around 12% content is typically preferred.

The materials of the invention may also optionally comprise one or more thermoplastic polymer layers attached to one or both of its outer surfaces. Suitable polymers for the thermoplastic polymer layer non-exclusively include polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France. Such a thermoplastic polymer layer may be bonded to the surfaces of the material using well known techniques, such as thermal lamination. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic polymer layers may alternatively be bonded to the surfaces of the material with hot glue or hot melt fibers as would be understood by one skilled in the art.

The thickness of the composite materials will correspond to the thickness of the individual fibers/tapes and the number of plies incorporated into the material. For example, a preferred woven fabric will have a preferred thickness of from about 25 µm to about 600 µm per ply/layer, more preferably from about 50 µm to about 385 µm and most preferably from about 75 µm to about 255 µm per ply/layer. A preferred two-ply non-woven fabric will have a preferred thickness of from about 12 µm to about 600 µm, more preferably from about 50 µm to about 385 µm and most preferably from about 75 µm to about 255 µm. Any thermoplastic polymer layers are preferably very thin, having preferred layer thicknesses of from about 1 µm to about 250 µm, more preferably from about 5 µm to about 25 µm and most preferably from about 5 µm to about 9 µm. Discontinuous webs such as SPUNFAB® non-woven webs are preferably applied with a basis weight of 6 grams per square meter (gsm). While such thicknesses are preferred, it is to be understood that other thicknesses may be produced to satisfy a particular need and yet fall within the scope of the present invention.

A fibrous material of the invention formed from a plurality of hybrid fiber/tape plies will have a preferred composite areal density of from about 0.2 psf to about 8.0 psf, more preferably from about 0.3 psf to about 6.0 psf, still more preferably from about 0.5 psf to about 5.0 psf, still more preferably from about 0.5 psf to about 3.5 psf, still more preferably from about 1.0 psf to about 3.0 psf, and most preferably from about 1.5 psf to about 2.5 psf.

The fibrous materials of the invention may be used in various applications to form a variety of different ballistic resistant articles using well known techniques. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The fibrous materials are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in a military and peace keeping missions.

As used herein, "soft" or "flexible" armor is armor that does not retain its shape when subjected to a significant amount of stress. The structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as unattached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus binder material. Hard articles like helmets and armor are preferably, but not exclusively, formed using a high tensile modulus binder material.

Ballistic resistance properties are determined using standard testing procedures that are well known in the art. Particularly, the protective power or penetration resistance of a ballistic resistant composite is normally expressed by citing the impacting velocity at which 50% of the projectiles penetrate the composite while 50% are stopped by the composite, also known as the $V_{50}$ value. As used herein, the "penetration resistance" of an article is the resistance to penetration by a designated threat, such as physical objects including bullets, fragments, shrapnel and the like. For composites of equal areal density, which is the weight of the composite divided by its area, the higher the $V_{50}$, the better the ballistic resistance of the composite.

The penetration resistance for designated threats can also be expressed by the total specific energy absorption ("SEAT") of the ballistic resistant material. The total SEAT is the kinetic energy of the threat divided by the areal density of the composite. The higher the SEAT value, the better the resistance of the composite to the threat. The ballistic resistant properties of the articles of the invention will vary depending on many factors, particularly the type of fibers used to manufacture the fibrous materials, the percent by weight of the fibers in the fibrous materials, the suitability of the physical properties of the coating materials, the number of layers of fabric making up the fibrous materials and the total areal density of the fibrous materials.

The following non-limiting examples serve to illustrate the invention:

Example 1

To prepare a hybrid fiber ply in accordance with the invention, a 650 denier SPECTRA® 1000 fiber bundle is blended with a 500 denier aramid fiber using a high pressure air jet. This results in an 1100 denier hybrid fiber. Several 1 lb hybrid fiber spools are made from this hybrid fiber. These spools are then used to convert the fibers into a plurality of unitapes having a fiber areal density of 53 g/m² (gsm). An aqueous based polyurethane resin (such as Bayer DISPERCOLL® U53 resin) is applied to the unitapes by dipping the fibers into a resin bath. Each unitape is then passed through a heated oven to remove any volatiles. After complete drying the unitape has a resin content of 16±2%. Unitapes are then cross-plied to achieve a continuous 2-ply roll of 0°/90° material.

Example 2 (Comparative)

The process of Example 1 is repeated except fiber plies are fabricated from 100% 650 denier SPECTRA® 1000 fibers. The fibers are coated with the same resin and contain the same resin content. Unitapes are cross-plied to achieve a continuous 2-ply roll of 0°/90° material.

Example 3 (Comparative)

The process of Example 1 is repeated except fiber plies are fabricated from 100% 1000 denier aramid fibers. The fibers are coated with the same resin and contain the same resin content. Unitapes are cross-plied to achieve a continuous 2-ply roll of 0°/90° material.

Each of the materials of Examples 1-3 are formed into 40 cm×40 cm shoot packs. The shoot packs are stitched at the corners to hold the layers together. Testing is conducted on a 127 cm thick calibrated Roma Plastilina #1 clay block as per NIJ Standard 0101.06. Testing is conducted to achieve a $V_{50}$ value within ±15 mps based on an average of at least eight bullets fired on each shoot pack where 4 bullets completely penetrate the shoot pack and 4 bullets partially penetrate the shoot pack. The data is expected to show that by using hybrid fiber plies, ballistic resistance increases and backface deformation is reduced.

Example 4 (Inventive), Example 5 (Comparative) and Example 6 (Comparative)

A plurality of 30 cm×30 cm fiber plies from each of Examples 1-3 are cut and stacked, maintaining a 0°/90° cross-plied configuration. Each stack is then molded in a 120° C. pre-heated mold mounted in a 200 ton hydraulic press. The stack of each material is preheated in the mold without molding pressure for 20 minutes. After 20 minutes, full clamping pressure is applied. After 15 minutes of molding, a cooling cycle is started. During the cooling cycle, molding pressure is not released. This process converts the stack into a consolidated panel. Once the panel reaches 50° C., the mold is opened and the panel is released for testing.

48 hours after molding, each panel is mounted on a frame without any clay in the back of the panel. Several 17 grain FSP (Fragment Simulating Projectiles) are fired on each panel to achieve a $V_{50}$ within ±15 m/s. The data is expected to show that the panels formed from the hybrid fiber plies have better ballistic penetration resistance than the other non-hybrid panels.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A material comprising at least one hybrid ply, which hybrid ply comprises a plurality of fibers or a plurality of tapes, which plurality of fibers comprises at least two physically different fiber types and which plurality of tapes comprises at least two physically different tape types, which physically different fiber or tape types have at least one dissimilar physical property, wherein said tapes have an average cross-sectional aspect ratio of greater than about 3:1, and wherein when the material comprises a plurality of fibers, greater than 50% by weight of the fibers have a tenacity of at least 25 g/denier, and wherein said at least two physically different fiber or tape types are formed from the same polymer.

2. The material of claim 1 wherein greater than 50% by weight of the fibers have a tenacity of at least 30 g/denier.

3. The material of claim 1 wherein said hybrid ply comprises a plurality of fibers having a first denier and a plurality of fibers having a second denier, wherein said first denier is greater than said second denier, and wherein greater than 50% by weight of the fibers have a tenacity of at least 40 g/denier.

4. The material of claim 1 wherein said hybrid ply comprises a plurality of fibers having a first denier per filament and a plurality of fibers having a second denier per filament, wherein said first denier per filament is greater than said second denier per filament.

5. The material of claim 1 wherein the at least one hybrid ply comprises fibers, wherein said fibers consist of polyethylene fibers.

6. The material of claim 1 wherein said hybrid ply comprises a plurality of physically dissimilar tapes.

7. The material of claim 1 wherein said hybrid ply comprises a plurality of physically dissimilar polyethylene fibers.

8. The material of claim 1 wherein said hybrid ply comprises physically different fiber types that are neither twisted nor entangled.

9. The material of claim 1 which comprises a plurality of hybrid plies that are consolidated together.

10. The material of claim 1 wherein the at least one hybrid ply comprises a plurality of physically different polyethylene tapes.

11. A material comprising at least one hybrid ply, which hybrid ply comprises a plurality of fibers or a plurality of tapes, which plurality of fibers comprises at least two physically different fiber types and which plurality of tapes comprises at least two physically different tape types, which physically different fiber or tape types have at least one dissimilar physical property, wherein said tapes have an average cross-sectional aspect ratio of greater than about 3:1, and wherein when the material comprises a plurality of fibers, greater than 50% by weight of the fibers have a tenacity of at least 25 g/denier, wherein said hybrid ply comprises a plurality of fibers having a tenacity of at least about 25 g/denier and a plurality of fibers having a tenacity of less than about 10 g/denier.

* * * * *